(12) United States Patent
Simonjan (10) Patent No.: US 12,172,467 B2
(45) Date of Patent: Dec. 24, 2024

(54) WHEEL SPACER DISC FOR MOTOR VEHICLES

(71) Applicant: Klaus Wohlfarth, Fichtenberg (DE)

(72) Inventor: Edgar Simonjan, Vellberg (DE)

(73) Assignee: Klaus Wohlfarth, Fichtenberg (DE)

( * ) Notice: Subject to any disclaimer, the term of this patent is extended or adjusted under 35 U.S.C. 154(b) by 567 days.

(21) Appl. No.: 17/429,123

(22) PCT Filed: Jan. 30, 2020

(86) PCT No.: PCT/EP2020/052253
§ 371 (c)(1),
(2) Date: Aug. 6, 2021

(87) PCT Pub. No.: WO2020/160990
PCT Pub. Date: Aug. 13, 2020

(65) Prior Publication Data
US 2022/0126625 A1    Apr. 28, 2022

(30) Foreign Application Priority Data
Feb. 8, 2019 (DE) ............. 20 2019 100 727.3

(51) Int. Cl.
*B60B 3/14* (2006.01)
*B60B 3/16* (2006.01)

(52) U.S. Cl.
CPC ............. *B60B 3/147* (2013.01); *B60B 3/16* (2013.01)

(58) Field of Classification Search
CPC ............. B60B 3/147; B60B 3/145; B60B 3/16
See application file for complete search history.

(56) References Cited

U.S. PATENT DOCUMENTS 3,759,576 A * 9/1973 Richter ............. B60B 3/14
301/35.629
3,820,851 A * 6/1974 Longo et al. ......... B60B 3/14
411/398

(Continued)

FOREIGN PATENT DOCUMENTS

CN        205075582 U     3/2016
DE        19507773 A1     9/1996

(Continued)

OTHER PUBLICATIONS

Office Action issued in corresponding Australia Application No. 2020217492 dated Sep. 13, 2022 (5 pages).

(Continued)

*Primary Examiner* — Jason R Bellinger
(74) *Attorney, Agent, or Firm* — FLYNN THIEL, P.C.

(57) ABSTRACT

A wheel spacer disk for motor vehicles including a center opening, a plurality of wheel bolt openings and at least two wheel hub centering elements for centering the wheel spacer disk relative to a wheel hub. A diameter of the center opening is greater than a diameter of a centering element of the wheel hub, and at least two wheel centering pins are provided for centering the wheel spacer disk relative to a wheel. The at least two wheel hub centering elements are arranged on a circumferential wall of the center opening, and the at least two wheel hub centering elements project at least partially into the center opening of the wheel spacer disk.

20 Claims, 5 Drawing Sheets

(56) References Cited

U.S. PATENT DOCUMENTS

| | | | |
|---|---|---|---|
| 5,362,134 A * | 11/1994 | Carmona | B60B 3/145 301/9.1 |
| 5,601,343 A * | 2/1997 | Hoffken | B60B 1/06 301/111.04 |
| 5,636,905 A | 6/1997 | Pagacz | |
| 5,887,952 A * | 3/1999 | Gandellini | B60B 3/02 301/35.63 |
| 9,463,665 B2 * | 10/2016 | Kleber | B60B 3/16 |
| 10,086,644 B2 | 10/2018 | Wohlfarth et al. | |
| 2002/0190570 A1 | 12/2002 | Gorges | |
| 2006/0186727 A1 | 8/2006 | McNeil | |
| 2007/0158998 A1 | 7/2007 | Aron | |
| 2012/0212037 A1 | 8/2012 | Bohrmann et al. | |
| 2016/0046146 A1 | 2/2016 | Wohlfarth et al. | |

FOREIGN PATENT DOCUMENTS

| | | |
|---|---|---|
| DE | 29915048 U1 | 2/2000 |
| DE | 19940524 A1 | 4/2001 |
| DE | 102016119271 A1 | 4/2018 |
| EP | 1500524 A2 | 1/2005 |
| JP | 63165201 U | 10/1988 |
| JP | 334901 U | 4/1991 |

OTHER PUBLICATIONS

Japanese Notice of Allowance issued in corresponding Japanese Application No. 2021-545855, issued Feb. 6, 2023 (2 pages).

Japanese Office Action with English translation issued in corresponding Japanese Application No. 2021-545855 dated Jul. 19, 2022 (7 pages).

German Search Report issued in corresponding German Application No. 20 2019 100 727.3, date of mailing Jun. 27, 2019 (8 pages).

Chinese Office Action issued in corresponding Chinese Application No. 202080013005.1 dated Sep. 14, 2023 (8 pages).

International Search Report with English Translation issued in corresponding International Application No. PCT/EP2020/052253 date of mailing May 15, 2020 (6 pages).

Written Opinion of International Searching Authority issued in corresponding International Application No. PCT/EP2020/052253 dated May 15, 2020 (6 pages).

* cited by examiner

WHEEL SPACER DISC FOR MOTOR VEHICLES

TECHNICAL FIELD

The invention relates to a wheel spacer disk for motor vehicles comprising a center opening, a plurality of wheel bolt openings and at least two wheel hub centering elements for centering the wheel spacer disk relative to a wheel hub. The invention further relates to an arrangement comprising a wheel hub, a wheel spacer disk and a wheel for motor vehicles.

BACKGROUND AND SUMMARY

One object of the invention is to improve a centering of a relatively thin wheel spacer disk for motor vehicles on a wheel hub.

According to the invention a wheel spacer disk for motor vehicles is provided, said wheel spacer disk comprising a center opening, comprising a plurality of wheel bolt openings and comprising at least two wheel hub centering elements for centering the wheel spacer disk relative to a wheel hub, wherein a diameter of the center opening is greater than a diameter of a centering element of the wheel hub, wherein at least two wheel centering pins are provided for centering the wheel spacer disk relative to a wheel, wherein the at least two wheel hub centering elements are arranged on a circumferential wall of the center opening, wherein the at least two wheel hub centering elements project at least in sections into the center opening of the wheel spacer disk.

A wheel spacer disk, also called a spacer disk, in the context of the invention is a disk which serves to achieve track widening on a motor vehicle and thus an increase in the track width of the motor vehicle. The wheel spacer disk may have various embodiments. An embodiment of the wheel spacer disk in an annular shape is particularly advantageous, wherein elements of the wheel spacer disk are arranged as symmetrically as possible about a central longitudinal axis of the wheel spacer disk. A symmetrical embodiment of the wheel spacer disk is particularly advantageous in terms of a mass distribution about a rotational axis which in an ideal case corresponds to the central longitudinal axis of the wheel spacer disk in order to avoid possible imbalance during a rotation of the wheel spacer disk.

"The center opening" is understood to mean a recess which extends along the central longitudinal axis of the wheel spacer disk and through the wheel spacer disk and may receive, at least partially, a centering element of the wheel hub, with the centering element of the wheel hub projecting into the center opening or projecting through the center opening. In a preferred embodiment, the center opening is arranged centrally on the wheel spacer disk. The center opening has a circumferential wall which has a height along the central longitudinal axis of the wheel spacer disk which corresponds in turn to a thickness of the wheel spacer disk.

The wheel spacer disk also has a plurality of wheel bolt openings, in particular five wheel bolt openings. The wheel bolt openings are designed as through-bores. The wheel bolt openings are located on a diameter which is greater than a diameter of the center opening. Moreover, the diameter on which the wheel bolt openings are located is smaller than an external diameter of the wheel spacer disk itself. A plurality of wheel bolt openings, for example three wheel bolt openings, are provided. Advantageously, four or more wheel bolt openings are provided. In a preferred embodiment, five wheel bolt openings are provided.

The wheel spacer disk also has at least two wheel hub centering elements for centering the wheel spacer disk relative to the wheel hub. The prerequisite for centering the wheel spacer disk relative to the wheel hub is that a diameter of the center opening is greater than a diameter of the centering element of the wheel hub, since the wheel spacer disk is otherwise not able to be pushed over the centering projections of the wheel hub. In a preferred embodiment, the at least two wheel hub centering elements are arranged on the circumferential wall of the center opening and project at least partially into the center opening of the wheel spacer disk. Thus, when pushing the wheel spacer disk onto the wheel hub and thus onto the centering element of the wheel hub, a centering of the wheel spacer disk relative to the wheel hub may be achieved by the at least two wheel hub centering elements. To this end, it is particularly advantageous that the at least two wheel hub centering elements are arranged substantially opposing one another and/or uniformly spaced apart from one another on the circumferential wall of the center opening in order to ensure the centering of the wheel spacer disk relative to the wheel hub in a manner which as far as possible is simple, secure and without play. For example, just one wheel hub centering element may be provided. Thus, the wheel hub centering element serves on the one side, and the circumferential wall of the center opening itself serves on a substantially opposing side on the circumferential wall of the center opening, for centering the wheel spacer disk relative to the wheel hub. Preferably, the wheel spacer disk is centered relative to the wheel hub, however, via the at least two wheel hub centering elements which are arranged substantially opposing one another and/or uniformly spaced apart on the circumferential wall of the center opening.

The wheel spacer disk has at least two wheel centering pins. The at least two wheel centering pins are suitable for centering the wheel relative to the wheel spacer disk. In this case, the at least two wheel centering pins are arranged such that they are located on an imaginary circular line having an external diameter which corresponds to a centering diameter of the wheel or is only slightly smaller than the centering diameter. To this end, the wheel advantageously has a centering element which has the centering diameter of the wheel and onto which at least two wheel centering elements may be pushed. As a result, the wheel may be centered relative to the wheel spacer disk. The centering element of the wheel may be configured in reality as a circular cylindrical central bore.

In one development of the invention, it may be provided that the at least two wheel centering pins are arranged on the circumferential wall of the center opening and that the at least two wheel centering pins project at least partially into the center opening of the wheel spacer disk and extend along a central longitudinal axis of the wheel spacer disk away from the wheel spacer disk.

Particularly advantageously, the at least two wheel centering pins are arranged substantially opposing one another and/or uniformly spaced apart from one another on the circumferential wall of the center opening in order to achieve a secure and simple centering of the wheel spacer disk relative to the wheel. So that the at least two wheel centering pins may be configured to be sufficiently stable, advantageously these at least two wheel centering pins project into the center opening of the wheel spacer disk. Such an arrangement is produced by the center opening having to have a greater diameter than the centering element of the wheel hub, but the at least two wheel centering pins have to be located on an imaginary circle with an external diameter which is smaller than, or at least the same size as, the diameter of the center opening of the wheel spacer disk which corresponds to the centering diameter of the wheel. As a result, the at least two wheel centering pins extend at least in sections radially to the central longitudinal axis of the wheel spacer disk into the center opening and/or into a projection of the center opening.

The two wheel centering pins extend along the central longitudinal axis of the wheel spacer disk away from the wheel spacer disk. Particularly advantageously, a long design of the at least two wheel centering pins results in an improved guidance of the centering element of the wheel relative to the wheel spacer disk and thus an improved, simpler and more secure centering of the wheel relative to the wheel spacer disk. The wheel centering pins may be at least twice as long as the wheel spacer disk is thick.

In a further development of the invention it may be provided that in each case a wheel centering pin and a wheel hub centering element are arranged substantially one behind the other, when viewed in the direction of the central longitudinal axis of the wheel spacer disk.

"Arranged substantially one behind the other" means that, when viewed in the direction of the central longitudinal axis, a wheel centering pin follows a wheel hub centering element. In other words, a wheel centering pin and a wheel hub centering element are not fully offset relative to one another. The wheel centering pins, however, may be designed to be wider or narrower than the wheel hub centering elements in a circumferential direction around the central longitudinal axis of the wheel spacer disk. In a preferred embodiment, when viewed in the circumferential direction about the central longitudinal axis of the wheel spacer disk, however, the wheel centering pins are designed to be of substantially the same width as the wheel hub centering elements.

Particularly advantageously, the wheel centering pins and the wheel hub centering elements are designed to be as wide as possible in the circumferential direction about the central longitudinal axis, in order to achieve a safe and simple centering of the wheel relative to the wheel spacer disk by means of the wheel centering elements, and of the wheel spacer disk relative to the wheel hub by means of the wheel hub centering elements. To this end, the at least two wheel centering pins have wheel centering surfaces which are as large as possible, in particular curved in a convex manner, and the wheel hub centering elements have wheel hub centering surfaces which are as large as possible, in particular curved in a concave manner.

In yet a further development of the invention it may be provided that the at least two wheel hub centering elements and the at least two wheel centering pins are configured integrally with the wheel spacer disk.

In a preferred embodiment, the at least two wheel hub centering elements and the at least two wheel centering pins are configured integrally and thus also from the same material as the wheel spacer disk. The wheel spacer disk consists, for example, of aluminum or any other relatively lightweight and yet robust material.

In a further development of the invention it may be provided that the at least two wheel hub centering elements and the at least two wheel centering pins are configured as separate components.

In a further embodiment, a separate component from the wheel spacer disk is provided with at least two wheel centering pins and at least two wheel hub centering elements which may be inserted into a center opening of the wheel spacer disk. The center opening thus has a greater diameter than an external diameter of the centering element. For example, the separate component is a ring which is configured from plastics and which is able to be fastened by means of a latching device to the circumferential wall of the center opening of the wheel spacer disk. This ring has the wheel hub centering elements which in the mounted state extend toward the central longitudinal axis of the wheel spacer disk and ensure the centering of the wheel spacer disk relative to the wheel hub. The ring also has the wheel centering pins which in the mounted state are arranged in each case along the central longitudinal axis of the wheel spacer disk in front of or to the rear of the at least two wheel hub centering elements, which extend along the central longitudinal axis of the wheel spacer disk and away therefrom and which ensure the centering of the wheel spacer disk relative to the wheel. This separate component with the at least two wheel centering pins and the at least two wheel hub centering elements may also be configured, for example, from a material similar to plastics or any other suitable material.

In yet a further development of the invention, at least three wheel centering pins may be provided.

In a further development of the invention, it may be provided that the at least three wheel centering pins are arranged so as to be distributed at equal spacings along a circumference of the center opening and, in particular, the three wheel centering pins are arranged offset relative to one another by 120°.

Particularly advantageously, the three wheel centering pins are arranged such that a secure and simple centering of the wheel on the wheel spacer disk is possible by the at least three wheel centering pins. To this end, the wheel centering pins may be configured to be curved on the wheel centering surfaces.

In a further development of the invention, it may be provided that the wheel spacer disk has at least three wheel hub centering elements.

An improved and simpler centering of the wheel spacer disk on the centering element of the wheel hub is ensured by at least three wheel hub centering elements if the at least three wheel hub centering elements are arranged at spacings which are uniform and/or as large as possible from one another on the circumferential wall of the center opening. In a preferred embodiment, the at least three wheel hub centering elements are arranged along the central longitudinal axis to the rear of the at least three wheel centering pins, wherein the at least three wheel centering pins are arranged so as to be distributed at equal spacings along a circumference of the center opening, offset relative to one another by 120°.

In yet a further development of the invention, it may be provided that the circumferential wall is oriented parallel to the central longitudinal axis of the wheel spacer disk.

Whilst the circumferential wall is oriented at least substantially parallel to the central longitudinal axis of the wheel spacer disk, the at least two or at least three wheel hub centering elements arranged on the circumferential wall run slightly conically to the central longitudinal axis and in the same direction in which the at least two or at least three wheel centering pins also extend, in order to be able to compensate for tolerances when pushing the wheel spacer disk onto the centering element of the wheel hub. The at least two or at least three wheel hub centering elements thus taper in the same direction in which the at least two or at least three wheel centering pins also extend, so that the further the wheel spacer disk is pushed onto the centering element of the wheel hub the greater the centering of the wheel spacer disk on the centering element of the wheel hub which is achieved.

Such an embodiment may also be transferred to the wheel centering pins so that the wheel centering surfaces of the wheel centering pins may run in a direction away from the wheel spacer disk and parallel to the central longitudinal axis of the wheel spacer disk conically in the direction of the central longitudinal axis, in order to achieve a centering of the wheel relative to the wheel spacer disk which as far as possible is without play and secure. The further the wheel is pushed onto the at least two or at least three wheel centering pins of the wheel spacer disk, the better the wheel is centered on the wheel spacer disk.

Thus, is it possible to achieve a compensation of tolerances, in particular manufacturing tolerances, when mounting the wheel on the wheel spacer disk and when mounting this wheel spacer disk on the wheel hub, and the wheel is always located without play on the wheel spacer disk and the wheel spacer disk is always located without play on the centering element of the wheel hub.

In a further development of the invention, it may be provided that the plurality of wheel bolt openings are configured as slots, in particular as curved slots.

By the configuration of the plurality of wheel bolt openings as slots, not only is it possible to compensate for a tolerance of a hole pattern of a plurality of wheel bolt openings of the wheel hub and of a plurality of wheel bolt openings of the wheel by means of the slots of the wheel bolt openings of the wheel spacer disk, but the wheel spacer disk may also be used for different vehicles with different hole patterns or bolt patterns. Due to the curved design of the slots, it is ensured that when inserting a wheel bolt a spacing of the central longitudinal axis of the wheel spacer disk to a central longitudinal axis of the wheel bolt is equal in every position of the wheel bolt in the curved slot.

In a development of the invention, it may be provided that the wheel spacer disk has a thickness along the central longitudinal axis of the wheel spacer disk which is less than 15 mm, in particular 2 mm, in particular 3 mm, 5 mm, 8 mm or 10 mm, in particular is between 2 mm and 15 mm.

Particularly preferably, the wheel spacer disk is configured as a thin wheel spacer disk which differs from thick wheel spacer disks, in that the wheel spacer disk has a thickness along the central longitudinal axis of 2 mm to 15 mm. Thin wheel spacer disks which have a thickness along the central longitudinal axis of the wheel spacer disk of 3 mm, 5 mm, 8 mm or 10 mm are particularly preferred.

In yet another development of the invention, in each case a bevel is provided at the transition between a radially external outer surface of the wheel centering pins and a disk surface of the wheel spacer disk.

A stabilizing of the wheel centering pins may be achieved by means of a bevel or chamfer between the radially external outer face of the wheel centering pins and the disk surface of the wheel spacer disk. In the mounted state of the wheel spacer disk, the wheel bears against the disk surface and the radially external outer face of the wheel centering pins bears against a central bore of the wheel. Generally, a bevel is also provided at the transition between the central bore of the wheel and a bearing surface of the wheel. Thus, in the mounted state, sufficient space is present in order to provide a bevel or chamfer between the wheel centering pin and the disk surface.

In a further development of the invention, an annular projection is provided, said annular projection surrounding the center opening and adjoining the center opening and transitioning into the bevels of the wheel centering pins.

In this manner the bevels or chamfers may be continued on the radially external outer face of the wheel centering pins around the entire center opening. The wheel spacer disk may be reinforced as a whole by means of such an annular projection which circulates around the entire center opening. This may be advantageous, in particular, when very thin wheel spacer disks having a thickness of only a few millimeters are used.

According to another aspect of the invention, an arrangement is also provided comprising a wheel hub, a wheel spacer disk according to the invention and a wheel for motor vehicles, wherein the wheel hub has a centering element which extends out from the wheel hub along a central longitudinal axis of the wheel hub, wherein the centering element has a centering ring and at least two centering projections, wherein the centering ring starts at the same height as a bearing surface of the wheel hub for the wheel spacer disk, extends away from the bearing surface along the central longitudinal axis and is centered relative to the central longitudinal axis of the wheel hub, wherein the at least two centering projections extend out from the centering ring substantially parallel to the central longitudinal axis of the wheel hub, wherein the centering element on the at least two centering projections has a greater diameter than on the centering ring, wherein the wheel spacer disk is centered relative to the wheel hub, wherein the wheel is centered relative to the wheel spacer disk, wherein the plurality of wheel bolt openings of the wheel spacer disk are oriented so as to be aligned with a plurality of wheel bolt openings of the wheel and a plurality of wheel bolt openings or stud bolts of the wheel hub, wherein the at least two wheel centering pins are arranged between the at least two centering projections and the wheel spacer disk bears against the centering ring by means of the at least two wheel hub centering elements.

The centering element of the wheel hub has on the at least two centering projections a greater diameter than the centering ring which starts at the same height as the bearing surface of the wheel hub for the wheel spacer disk and extends along the central longitudinal axis of the wheel hub away from the bearing surface of the wheel hub. In order to achieve a centering of the wheel spacer disk relative to the wheel hub by means of the centering ring of the centering element of the wheel hub and the at least two wheel hub centering elements of the wheel spacer disk, the wheel hub centering elements of the wheel spacer disk define portions of an imaginary circle with an internal diameter, which corresponds to an external diameter of the centering ring of the centering element of the wheel hub or is only slightly larger. In order to be able to bring a wheel hub bearing surface of the wheel spacer disk via the centering element of the wheel hub into abutment with the bearing surface of the wheel hub during a mounting process, the diameter of the center opening of the wheel spacer disk is designed to be greater than the external diameter of the centering element of the wheel hub on the at least two centering projections. Thus, during the mounting of the wheel spacer disk on the wheel hub, care has to be taken that the wheel hub centering elements and thus also the wheel centering pins between the at least two centering projections of the centering element of the wheel hub, and which are arranged substantially to the rear of the wheel hub centering elements along the central longitudinal axis of the wheel spacer disk, may be brought into abutment with the wheel hub. In a mounted state of the wheel spacer disk on the wheel hub, the wheel spacer disk is thus centered by means of the at least two wheel hub centering elements relative to the centering element of the wheel hub. The centering of the wheel spacer disk on the wheel hub is carried out by means of the wheel hub centering surfaces of the wheel hub centering elements which bear against the centering ring of the features. Moreover, the bearing surface of the wheel hub and the wheel hub bearing surface of the wheel spacer disk bear against one another.

In a development of the invention, it may be provided that the centering element has at least three centering projections which extend from the centering ring, which are distributed at equal spacings over a circumference of a center opening of the wheel hub and, in particular, are offset relative to one another by 120°.

The three centering projections are arranged such that when mounting the wheel on the wheel hub without the wheel spacer disk a secure and simple centering of the wheel on the wheel hub is possible by the at least three centering projections. The wheel hub centering elements of the wheel spacer disk are provided so that the thin wheel spacer disk which bridges the centering projections, which were originally provided for the wheel, may be centered on the wheel hub, said wheel hub centering elements bearing against the centering ring of the wheel hub.

In a further development of the invention, it may be provided that the plurality of wheel centering pins, in particular three wheel centering pins, are arranged between the plurality of centering projections.

In a preferred embodiment, the plurality of wheel centering pins are arranged between the plurality of centering projections. The plurality of wheel centering pins are thus arranged between the plurality of centering projections since they project from the circumferential wall of the center opening of the wheel spacer disk into the center opening and thus form a smaller internal diameter of the center opening of the wheel spacer disk than the external diameter of the centering element on the plurality of centering projections. Thus, it is possible to bring the wheel hub bearing surface of the wheel spacer disk into abutment with the bearing surface of the wheel hub in only one orientation in which the plurality of wheel centering pins are arranged between the plurality of centering projections. The same applies to the plurality of wheel hub centering elements which, when viewed in the direction of the central longitudinal axis of the wheel spacer disk, are arranged substantially to the rear of the plurality of wheel centering pins. The plurality of wheel hub centering elements also reduce the diameter of the center opening of the wheel spacer disk such that it is possible to bring the wheel hub bearing surface of the wheel spacer disk into abutment with the bearing surface of the wheel hub in only one orientation in which the plurality of wheel hub centering elements and thus also the plurality of wheel centering pins are arranged between the plurality of centering projections. In this case, the plurality of wheel hub centering elements bear against the centering ring of the centering element of the wheel hub and center the wheel spacer disk relative to the wheel hub.

Particularly advantageously, it is possible by means of this arrangement to mount particularly thin wheel spacer disks which do not project over the centering projections of the wheel hub, which were originally provided for the wheel, at a height from the bearing surface of the wheel hub along the central longitudinal axis of the wheel hub, and which are thus not able to be centered on the centering projections of the wheel hub which were originally provided for the wheel.

In yet a further development of the invention, it may be provided that the at least two wheel centering pins of the wheel spacer disk project over the at least two centering projections of the centering element of the wheel hub along the central longitudinal axis of the wheel hub.

Since the wheel centering pins of the wheel spacer disk in the mounted state project over the centering projections of the centering element of the wheel hub, a secure reception of the wheel and a secure centering of the wheel relative to the wheel spacer disk is ensured without the wheel bearing at least in sections against the centering projections of the centering element of the wheel hub originally designed for the wheel.

BRIEF DESCRIPTION OF THE DRAWINGS

Further advantages and aspects of the invention are disclosed in the following description of a preferred embodiment of the invention, which is described hereinafter with reference to the figures. Individual features of the various embodiments shown and described here may be combined together in any manner without departing from the scope of the invention. The same also applies to the combination of individual features, without the further individual features by which they are described and/or shown in this context. In the figures.

DETAILED DESCRIPTION OF THE EXEMPLARY EMBODIMENTS

Figure 1:
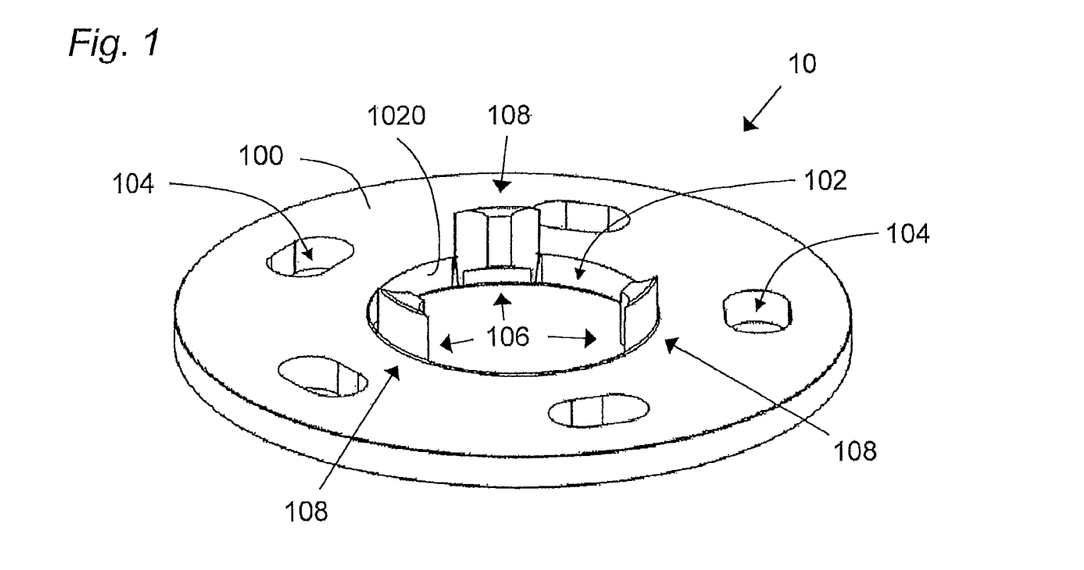
FIG. 1 shows an isometric view, obliquely from above, of a wheel spacer disk according to a first embodiment of the invention.
Figure 3:
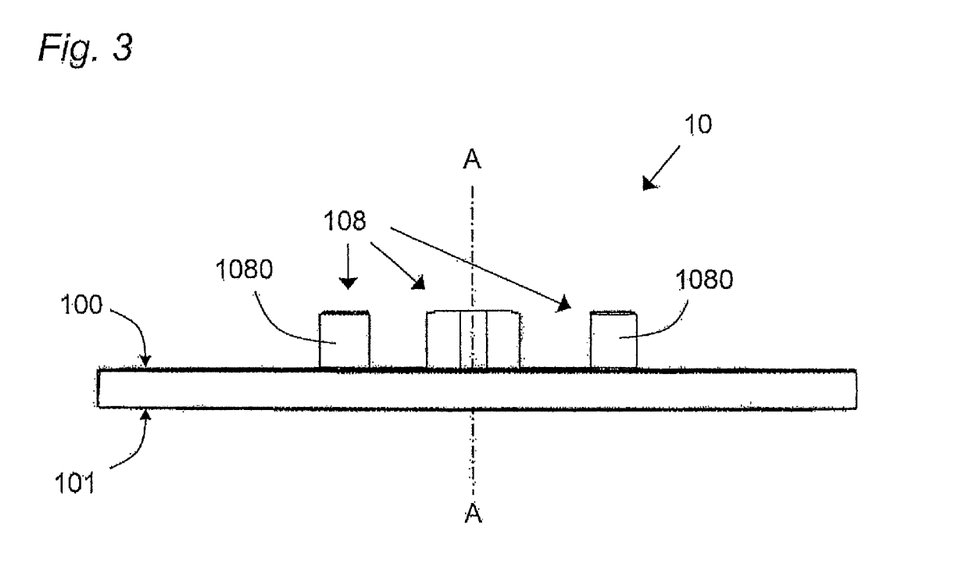
FIG. 3 shows a side view of the wheel spacer disk of FIG. 1.

FIG. 1 shows an isometric view obliquely from above of a wheel spacer disk 10 according to a first embodiment of the invention. The wheel spacer disk 10 has a center opening 102 and five wheel bolt openings 104. The wheel bolt openings 104 are arranged as curved slots and through-openings on the wheel spacer disk 10. The five wheel bolt openings 104 are located on a diameter which is located between an external diameter of the wheel spacer disk 10 and a diameter of the center opening 102. Moreover, three wheel hub centering elements 106 are provided, said wheel hub centering elements being arranged along a central longitudinal axis A of the wheel spacer disk 10 shown in FIG. 3, in each case to the rear of one of three wheel centering pins 108 shown in FIG. 1. Both the three wheel hub centering elements 106 and the three wheel centering pins 108 are arranged on a circumferential wall 1020 of the wheel spacer disc 10 which defines the center opening 102. More specifically, the three wheel hub centering elements 106 and the three wheel centering pins 108 extend from the circumferential wall 1020 and thus reduce at least in sections the diameter of the center opening 102. FIG. 1 also shows a wheel bearing surface 100 which in a mounted state is in abutment with a wheel, not shown here, but see FIGS. 6 and 7. FIGS. 1 and 3 also show that the wheel centering pins 108 in each case have a wheel centering surface 1080, which is curved in a convex manner, remote from the center opening 102.

Figure 2:
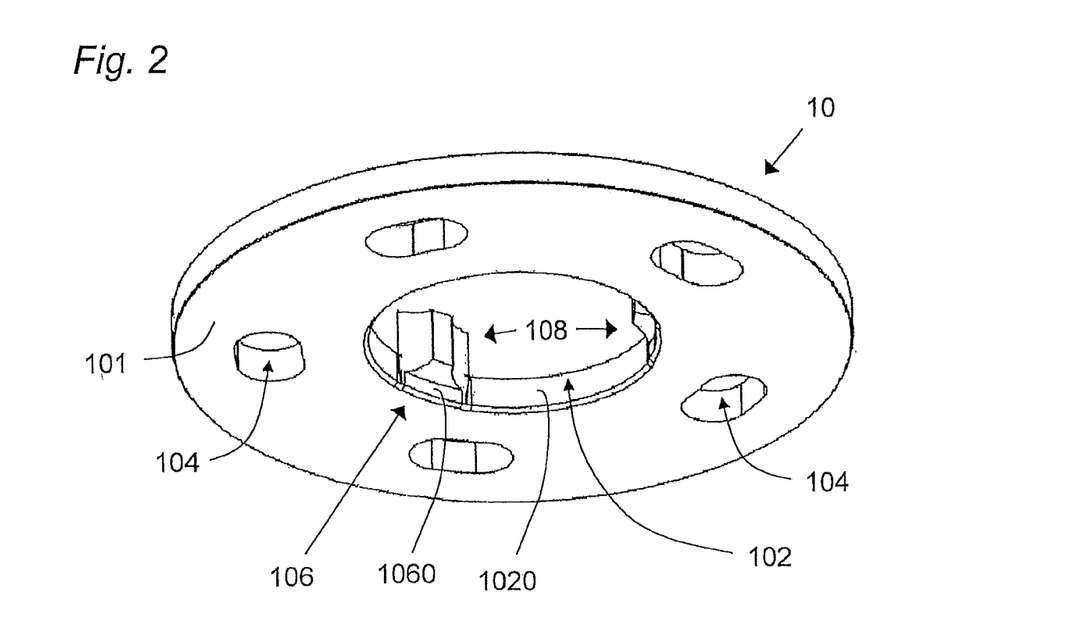
FIG. 2 shows an isometric view, obliquely from below, of the wheel spacer disk of FIG. 1.

FIG. 2 shows an isometric view obliquely from below of the wheel spacer disk 10 of FIG. 1. FIG. 2 also shows substantially the features which have already been shown and described in FIG. 1. In comparison with FIG. 1, FIG. 2 shows the wheel hub bearing surface 101 which in a mounted state bears against a wheel hub, not shown here, but see FIGS. 6 and 7. In FIG. 2, the center opening 102 with the circumferential wall 1020, the five wheel bolt openings 104, the wheel hub centering elements 106 and the wheel centering pins 108 are also shown. It is also visible that the wheel hub centering elements 106 in each case have a wheel hub centering surface 1060 which is curved in a concave manner and which is oriented coaxially with the central longitudinal axis of the wheel spacer disk 10.

FIG. 3 shows a side view of the wheel spacer disk 10 according to FIG. 1. FIG. 3 also substantially shows the features which have already been shown and described in FIGS. 1 and 2. The three wheel centering pins 108 and the planar wheel bearing surface 100, the planar wheel hub bearing surface 101 and the central longitudinal axis A are shown. The wheel centering surfaces 1080 are visible on at least two of the three wheel centering pins 108.

Figure 4:
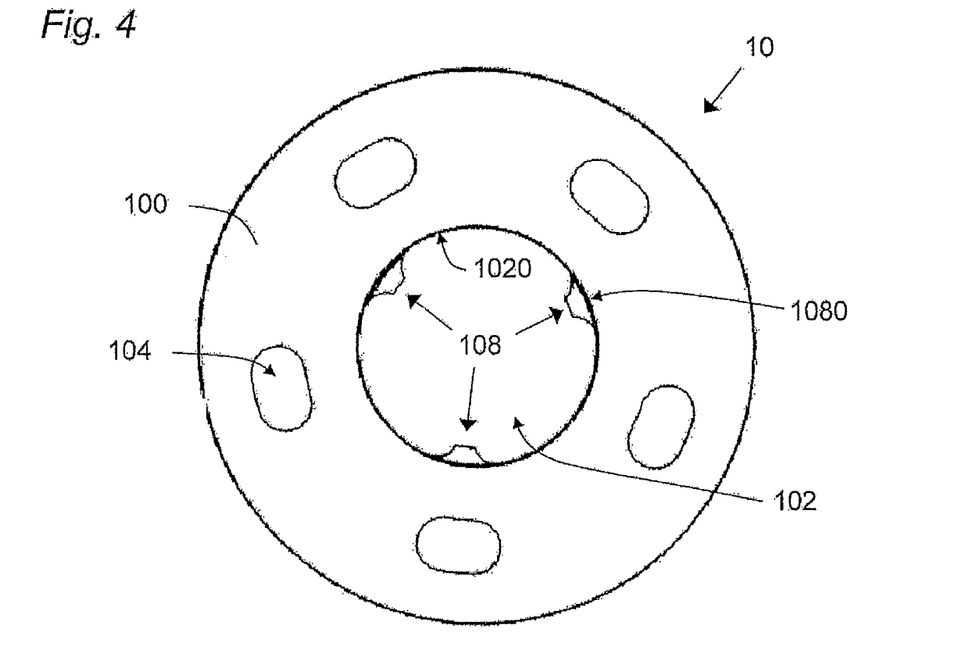
FIG. 4 shows a plan view of the wheel spacer disk of FIG. 1.

FIG. 4 shows a plan view of the wheel spacer disk 10 according to FIG. 1. FIG. 4 also substantially shows the features which have already been shown and described in FIGS. 1 to 3. The wheel bearing surface 100, the center opening 102 together with the circumferential wall 1020 and the five wheel bolt openings 104 in the form of the five slots are shown. The three wheel centering pins 108 shown in plan view also show in each case the wheel centering surfaces 1080 which are curved in a convex manner.

Figure 5:
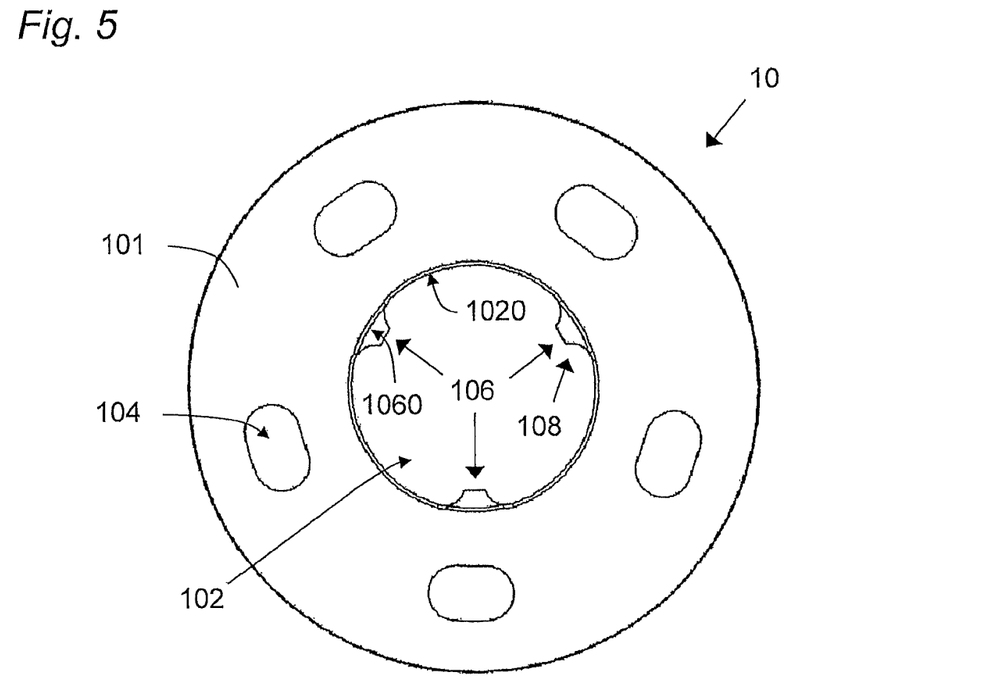
FIG. 5 shows a view from below of the wheel spacer disk of FIG. 1.

FIG. 5 shows a view from below of the wheel spacer disk 10 according to the first embodiment of the invention. FIG. 5 also substantially shows the features which have already been shown and described in FIGS. 1 to 4. The wheel hub bearing surface 101, the center opening 102 together with the circumferential wall 1020 and the five wheel bolt openings 104 designed as slots are shown. Moreover, the wheel hub centering elements with the wheel hub centering surface 1060 which are in each case curved in a concave manner are illustrated. The wheel centering pins 108 are also visible from a lower face and it can be seen that the wheel centering pins 108 project further into the center opening 102 than the wheel hub centering elements 106.

Figure 6:
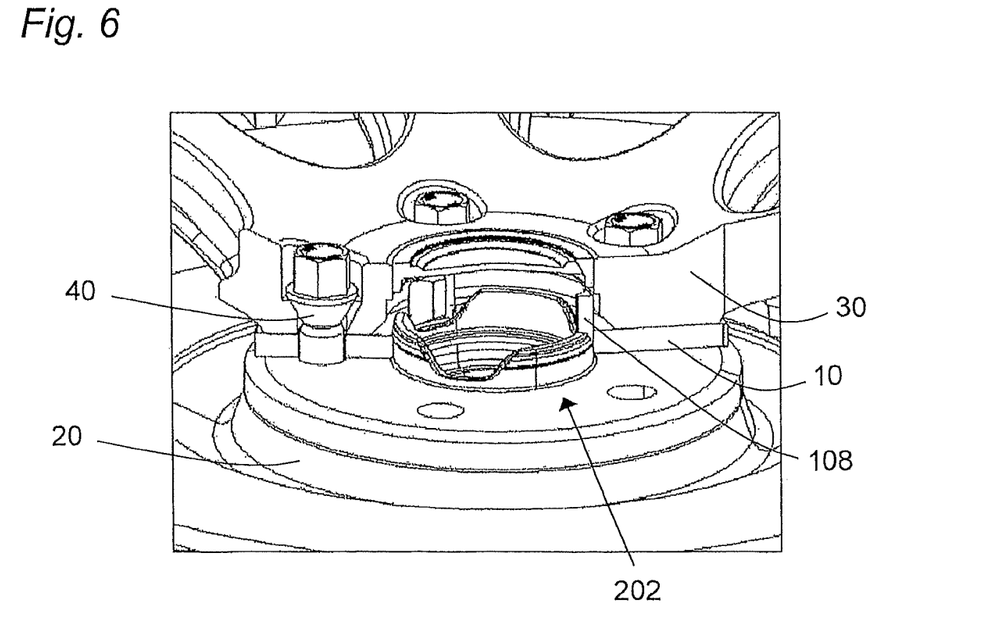
FIG. 6 shows a partial isometric view, obliquely from above, of an arrangement comprising a wheel hub, a wheel and the wheel spacer disk of FIG. 1.

FIG. 6 shows a detail of an isometric view obliquely from above of an arrangement comprising a wheel hub 20, a wheel 30 and the wheel spacer disk 10 according to the invention of FIG. 1. The wheel spacer disk 10 is located between the wheel hub 20 and the wheel 30 and bears against both the wheel hub 20 and the wheel 30. The wheel 30 is fastened by a plurality of wheel bolts 40 to the wheel hub 20, whilst the wheel spacer disk 10 is clamped between the wheel 30 and the wheel hub 20. By means of the detail, only three wheel bolts 40 of the actual five wheel bolts 40 are illustrated. Moreover, the wheel spacer disk 10 is centered relative to the centering element 202 of the wheel hub 20. The wheel 30 is also centered relative to the wheel spacer disk 10 by means of the wheel centering pins 108 of the wheel spacer disk 10.

Figure 7:
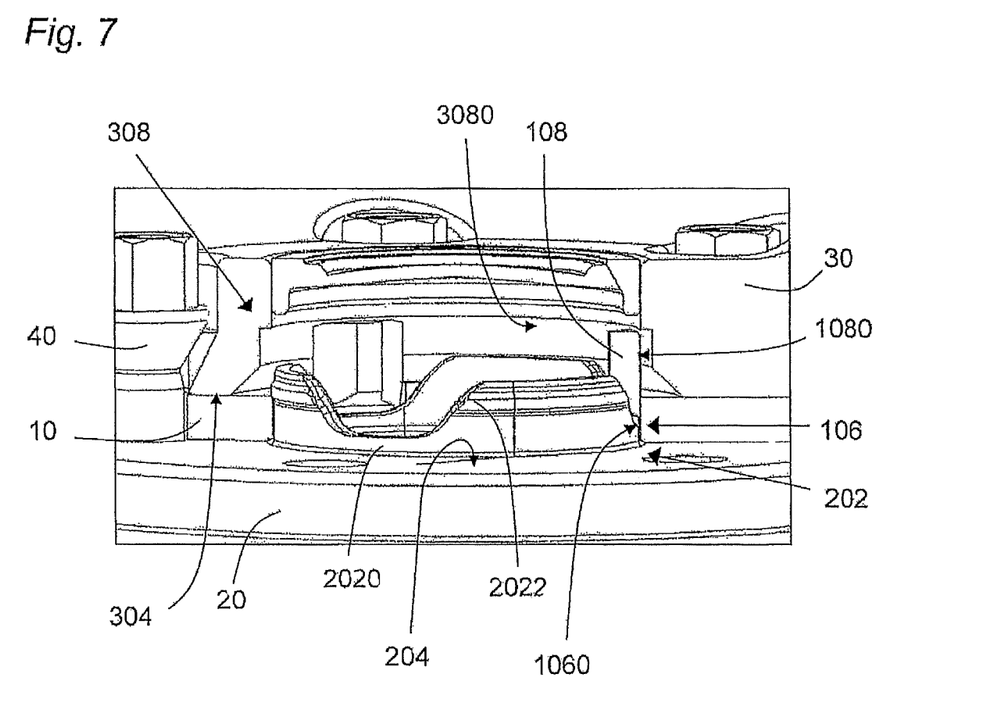
FIG. 7 shows an enlarged isometric view of the arrangement according to FIG. 6 obliquely from above.

FIG. 7 shows an enlarged isometric view of the detail obliquely from above of the arrangement according to FIG. 6. FIG. 7 also substantially shows the features which have already been shown and described in FIG. 6. FIG. 7 also shows the wheel hub 20 with the centering element 202 and the bearing surface 204 of the wheel hub 20. The centering element 202 has a centering ring 2020 and a centering projection 2022. The centering element 202 is configured as an approximately cylindrical tube, wherein three recesses which extend away from an upper edge of the centering element 202 in FIG. 7 downwardly to the circumferential centering ring 2020 are provided in the wall of the tube. The centering projections 2022 are thus configured as three portions of equal length which are spaced apart from one another equally in the circumferential direction. The centering ring 2020 starts at the height of the bearing surface 204 of the wheel hub 20 and extends away from the bearing surface 204 upwardly in the direction of the central longitudinal axis of the wheel hub 20. In the region of the centering ring 2020, the centering element 202 has a smaller diameter than in the region of the centering projections 2022. The centering projections 2022 thus project in the radial direction relative to the centering ring 2020. The wheel spacer disk 10 bears by means of the wheel hub bearing surface 101 against the bearing surface of the wheel hub 204. Moreover, the wheel centering pins 108, when viewed in the circumferential direction, are located between the centering projections 2022 of the centering element 202 of the wheel hub 20. In the arrangement, when viewed along the central longitudinal axis A, the wheel hub centering elements 106 are arranged below the wheel centering pins 108. The wheel hub centering elements 106 are oriented and centered on the centering ring 2020 of the centering element 202 of the wheel hub 20 by means of the wheel hub centering surfaces 1060 on which the wheel hub centering elements 106 are arranged. In other words, the wheel hub centering surfaces 1060 bear against the centering ring 2020 of the centering element 202 of the wheel hub 20. Moreover, the wheel 30 is centered on the wheel centering pin 108 by means of a central bore 308 of the wheel 30. In this case the wheel centering surfaces 1080, which are curved in a convex manner, bear against a wall 3080 of the central bore 308 of the wheel. It may also be seen that the wheel centering pins 108 project over the centering projections 2022 along the central longitudinal axis A by approximately twice the amount. The wheel bolts 40 fix the wheel 30 to the wheel hub 20 and clamp the wheel spacer disk 10 between the wheel 30 and the wheel hub 20. In this case the bearing surface 204 of the wheel hub 20 bears against the wheel hub bearing surface 101 of the wheel spacer disk 10 and the wheel bearing surface 100 of the wheel spacer disk 10 bears against a bearing surface of the wheel 30.

When mounting the wheel spacer disk 10 on the wheel hub 20, the wheel spacer disk 10 may be oriented such that the three wheel centering pins 108 of the wheel spacer disk 10 are arranged between the centering projections 2022 of the centering element 202 of the wheel hub 20. Then the wheel spacer disk 10 may be pushed onto the centering element 202 of the wheel hub 20. The wheel hub centering elements 106 of the wheel spacer disk 10 thus permit the centering of the wheel spacer disk 10 relative to the wheel hub 20, by the wheel hub centering surfaces 1060 bearing against the centering ring 2020 of the centering element 202.

When mounting the wheel 30 on the wheel spacer disk 10 the wheel 30 may be oriented relative to the wheel spacer disk 10 such that the three wheel centering pins 108 of the wheel spacer disk 10 are in the extension of the central bore 308 of the wheel 30. Then the wheel 30 may be pushed with the central bore 308 onto the three wheel centering pins 108 of the wheel spacer disk 10. The three wheel centering pins 108 of the wheel spacer disk 10 permit the centering of the wheel 30 on the wheel spacer disk 10 by means of the three wheel centering surfaces 1080 which are curved in a convex manner and which bear against the inner wall 308 of the wheel 30. Optionally, the wheel 30 then still has to be rotated about the central longitudinal axis until the wheel bolt openings of the wheel 30 are aligned with the wheel bolt openings of the wheel spacer disk 10 and the wheel hub 20. If the wheel hub is provided with stud bolts, this step may be dispensed with. Subsequently, the wheel bolts 40 are screwed in.

Figure 8:
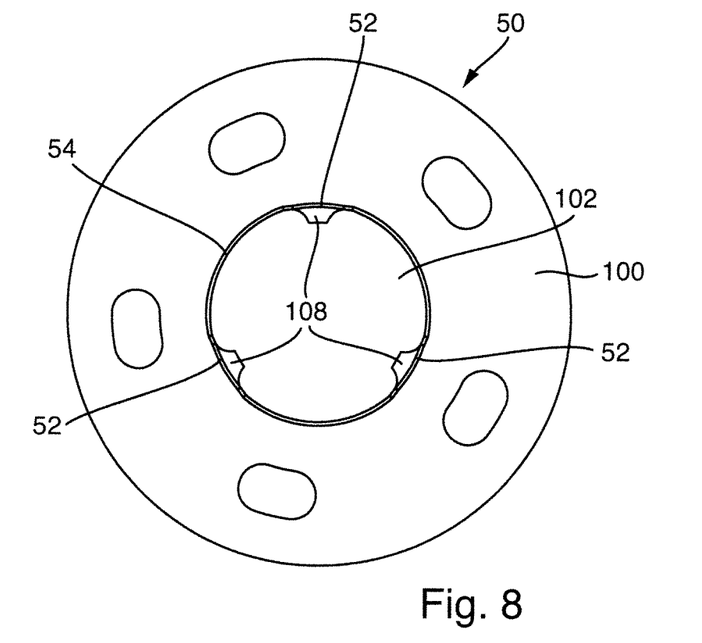
FIG. 8 shows a front view of a wheel spacer disk according to a second embodiment of the invention.

FIG. 8 shows a plan view of a wheel spacer disk 50 according to a second embodiment of the invention. The wheel spacer disk 50 differs only slightly from the wheel spacer disk 10 of FIGS. 1 to 5, such that only the differences between the wheel spacer disk 50 and the wheel spacer disk 10 are described hereinafter. Components of the wheel spacer disk 50 which have the same functions as the wheel spacer disk 10 and/or which are identical thereto are denoted by the same reference numerals.

The wheel spacer disk 50 has in each case a bevel 52 at the transition between the wheel bearing surface 100 and the respective radially external outer surfaces of the wheel centering pins 108. This bevel 52 forms a chamfer and is configured, for example, at an angle of 45° to the radially external outer surface of the wheel centering pins 108 and the wheel bearing surface 100. The bevels 52 in each case stabilize the associated wheel centering pins 108.

It may also be identified in FIG. 8 that an annular projection 54 which directly adjoins the center opening 102 of the wheel spacer disk 50 and which circulates around the center opening 102 is provided. In the region of the wheel centering pins 108, the circumferential annular projection 54 transitions into the bevels 52. The annular projection 54 projects slightly over the wheel bearing surface 100 of the wheel spacer disk 50, for example by only 1 mm to 2 mm, see FIG. 9. However, the annular projection 54 stabilizes the wheel spacer disk 50 significantly. This is advantageous, in particular, when the thickness of the wheel spacer disk 50 is only a few millimeters.

Figure 9:
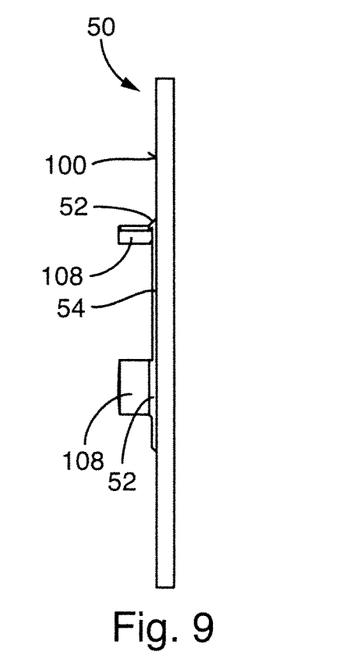
FIG. 9 shows a side view of the wheel spacer disk of FIG. 8.

In FIG. 9 it may be identified on the wheel centering pin 108, located at the top in FIG. 9, that the bevel 52 is oriented at an angle of 45° relative to both the wheel bearing surface 100 and the radially external outer surface of the wheel centering pin 108. The bevels 52 are designed to be slightly higher than the circumferential annular projection 54.

Figure 10:
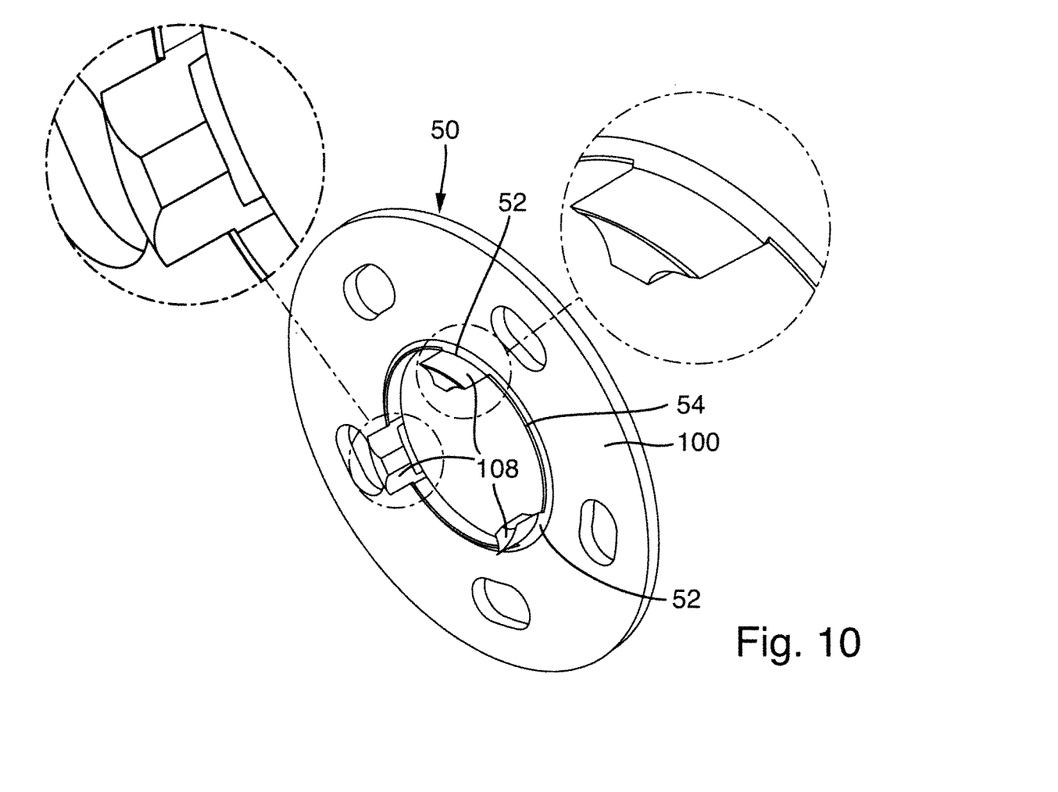
FIG. 10 shows an isometric view, obliquely from above, of the wheel spacer disk of FIG. 8 with two additional detailed enlargements.

FIG. 10 shows an isometric view of the wheel spacer disk 50 of FIG. 8 obliquely from above. The design of the bevels 52 between the wheel bearing surface 100 and the respective radially external outer surface of the wheel centering pins 108 may be seen in FIG. 10, see also the detailed enlargements in FIG. 10. The circumferential annular projection 54 may also be clearly identified.

The invention claimed is:

1. A wheel spacer disk for motor vehicles, comprising:
 a circumferential wall defining a center opening, the center opening having a diameter, the diameter being greater than a diameter of a centering element of a wheel hub;
 a plurality of wheel bolt openings;
 at least two wheel hub centering elements arranged on the circumferential wall for centering the wheel spacer disk relative to the wheel hub, the at least two wheel hub centering elements projecting at least partially into the center opening; and
 at least two wheel centering pins for centering the wheel spacer disk relative to a wheel.

2. The wheel spacer disk as claimed in claim 1, wherein the at least two wheel centering pins are arranged on the circumferential wall and the at least two wheel centering pins project at least partially into the center opening of the wheel spacer disk and extend substantially parallel to a central longitudinal axis of the wheel spacer disk in a direction away from the wheel spacer disk.

3. The wheel spacer disk as claimed in claim 1, wherein when viewed in the direction of a central longitudinal axis of the wheel spacer disk, each wheel centering pin and one of the wheel hub centering elements are arranged substantially one behind the other.

4. The wheel spacer disk as claimed in claim 1, wherein the at least two wheel hub centering elements and the at least two wheel centering pins are configured integrally with the wheel spacer disk.

5. The wheel spacer disk as claimed in claim 1, wherein the at least two wheel centering pins comprises at least three wheel centering pins.

6. The wheel spacer disk as claimed in claim 5, wherein the at least three wheel centering pins are arranged so as to be distributed at equal spacings from one another along a circumference of the center opening.

7. The wheel spacer disk as claimed in claim 1, wherein the at least two wheel hub centering elements comprises at least three wheel hub centering elements.

8. The wheel spacer disk as claimed in claim 1, wherein the circumferential wall is oriented parallel to a central longitudinal axis of the wheel spacer disk.

9. The wheel spacer disk as claimed in claim 1, wherein each of the wheel bolt openings of the plurality of wheel bolt openings is configured as a slot.

10. The wheel spacer disk as claimed in claim 1, wherein the wheel spacer disk has a thickness oriented substantially parallel to a central longitudinal axis of the wheel spacer disk, the thickness being less than 15 mm.

11. The wheel spacer disk as claimed in claim 1, wherein the at least two wheel centering pins have respective radially external outer surfaces, and the wheel spacer disk further includes a wheel bearing surface and a bevel at a transition between the radially external outer surfaces of the wheel centering pins and the wheel bearing surface of the wheel spacer disk.

12. The wheel spacer disk as claimed in claim 11, wherein the wheel spacer disk further includes an annular projection surrounding the center opening and adjoining the circumferential wall defining the center opening, said annular projection transitioning into the bevels of the at least two wheel centering pins.

13. An arrangement for motor vehicles comprising:
 a wheel hub, the wheel hub including a bearing surface and a centering element, the centering element having a diameter and extending out from the wheel hub substantially parallel to a central longitudinal axis of the wheel hub, the centering element having a centering ring and at least two centering projections, the centering ring starting at a same height as the bearing surface of the wheel hub for a wheel spacer disk, the centering ring extending away from the bearing surface substantially parallel to the central longitudinal axis and being centered relative to the central longitudinal axis of the wheel hub, the at least two centering projections extending out from the centering ring substantially parallel to the central longitudinal axis of the wheel hub, the centering element on the at least two centering projections having a greater diameter than on the centering ring, the wheel hub further including a plurality of wheel bolt openings or stud bolts;

a wheel, the wheel having a plurality of wheel bolt openings; and the wheel spacer disk comprising:
- a circumferential wall, the circumferential wall defining a center opening of the wheel spacer disk, the center opening having a diameter, the diameter being greater than the diameter of the centering element of the wheel hub;
- a plurality of wheel bolt openings, the plurality of wheel bolt openings of the wheel spacer disk being oriented so as to be aligned with the plurality of wheel bolt openings of the wheel and the plurality of wheel bolt openings or stud bolts of the wheel hub;
- at least two wheel hub centering elements arranged on the circumferential wall for centering the wheel spacer disk relative to the wheel hub, the at least two wheel hub centering elements projecting at least partially into the center opening of the wheel spacer disk; and
- at least two wheel centering pins for centering the wheel spacer disk relative to the wheel, each of the at least two wheel centering pins being arranged between two of the at least two centering projections of the wheel hub and the wheel spacer disk bears against the centering ring through the at least two wheel hub centering elements.

14. The arrangement as claimed in claim 13, wherein the at least two centering projections of the centering element of the wheel hub comprises at least three centering projections, the at least three centering projections extending from the centering ring and being distributed at equal spacings with one another over a circumference of a center opening of the wheel hub.

15. The arrangement as claimed in claim 13, wherein each of the wheel centering pins of the plurality of wheel centering pins is arranged between two of the centering projections of the wheel hub.

16. The arrangement as claimed in claim 13, wherein the at least two rim centering pins of the wheel spacer disk project over the at least two centering projections of the centering element of the wheel hub.

17. The wheel spacer disk as claimed in claim 6, wherein the at least three wheel centering pins are arranged offset relative to one another by 120 degrees.

18. The wheel spacer disk as claimed in claim 9, wherein the slots are configured as curved slots.

19. The wheel spacer disk as claimed in claim 1, wherein the wheel spacer disk has a thickness oriented substantially parallel to a central longitudinal axis of the wheel spacer disk, the thickness of the wheel spacer disk being between 2 mm and 15 mm.

20. The arrangement as claimed in claim 14, wherein the at least three centering projections are offset relative to one another by 120 degrees over the circumference of the center opening of the wheel hub.

* * * * *